(12) United States Patent
Smith et al.

(10) Patent No.: US 9,195,731 B2
(45) Date of Patent: Nov. 24, 2015

(54) SYSTEM AND METHOD FOR DATA PROVISION

(71) Applicant: Mood International Limited, York (GB)

(72) Inventors: Simon Smith, York (GB); Dick Whittington, York (GB)

(73) Assignee: MOOD INTERNATIONAL LIMITED, York (GB)

( * ) Notice: Subject to any disclaimer, the term of this patent is extended or adjusted under 35 U.S.C. 154(b) by 104 days.

(21) Appl. No.: 13/687,464

(22) Filed: Nov. 28, 2012

(65) Prior Publication Data

US 2013/0138697 A1     May 30, 2013

(30) Foreign Application Priority Data

Nov. 28, 2011     (GB) .................................. 1120422.9

(51) Int. Cl.
*G06F 17/30*     (2006.01)
*G06Q 10/06*     (2012.01)

(52) U.S. Cl.
CPC .... *G06F 17/30595* (2013.01); *G06F 17/30286* (2013.01); *G06F 17/30587* (2013.01); *G06Q 10/067* (2013.01)

(58) Field of Classification Search
CPC .................. G06F 17/30598; G06F 17/30321; G06F 17/30424; G06F 17/3071; G06F 17/30256; G06F 17/30687; G06F 17/30294; G06F 17/30539; G06F 17/30864; G06F 17/30011; G06F 17/3053; G06F 17/30705
USPC .................................................. 707/795, 803
See application file for complete search history.

(56) References Cited

U.S. PATENT DOCUMENTS

| | | | |
|---|---|---|---|
| 8,234,206 B1* | 7/2012 | Ogundipe ........................ 703/37 |
| 2004/0199528 A1* | 10/2004 | Kayamoto et al. ............ 707/100 |
| 2006/0100838 A1* | 5/2006 | Dunnill et al. ................... 703/11 |
| 2007/0011184 A1* | 1/2007 | Morris et al. .................. 707/101 |
| 2007/0179945 A1* | 8/2007 | Marston et al. ................... 707/5 |
| 2009/0271394 A1* | 10/2009 | Allen et al. ........................ 707/5 |
| 2010/0088304 A1* | 4/2010 | Jackson ........................ 707/706 |
| 2010/0161602 A1* | 6/2010 | Caceres ........................ 707/736 |
| 2011/0010366 A1* | 1/2011 | Varshavsky et al. .......... 707/732 |

* cited by examiner

*Primary Examiner* — Pierre Vital
*Assistant Examiner* — Andalib Lodhi
(74) *Attorney, Agent, or Firm* — Head, Johnson & Kachigian, P.C.

(57) ABSTRACT

A method and system is provided for the generation of a model to represent at least part of an organization. The model includes a plurality of items of relevance to the organization and said items are linked to each other and/or one or more organization database and/or one or more data sources external to the model so as to be able to generate, in a predefined manner a response to a user request made of the model. Thus user's receive appropriate automated support for their decision processes which is more efficient and allows better informed decisions to be made on the basis of the responses from the model. As the model is generated with reference to the organization rather than the raw data sources the use of the model is supportive of the organization work methodology and the responses are at the required level with respect to the decisions are to be made within the organization.

11 Claims, 1 Drawing Sheet

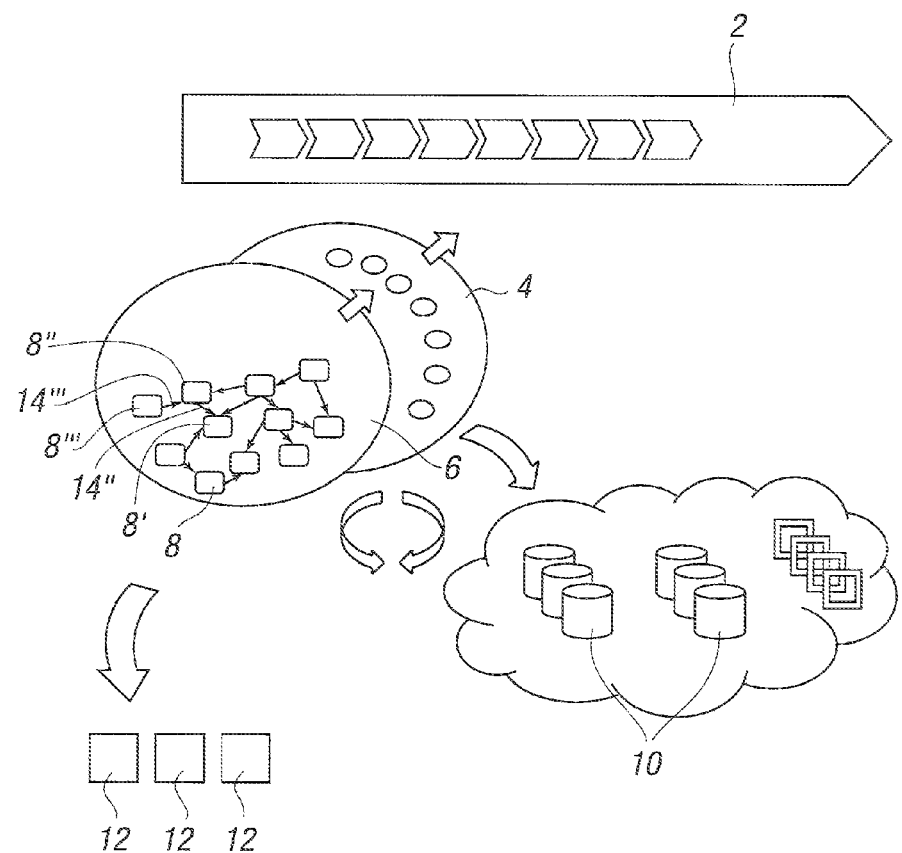

SYSTEM AND METHOD FOR DATA PROVISION

BACKGROUND OF THE INVENTION

1. Field of the Invention

The invention which is the subject of this application relates to a system and method for the provision of data which can be used in the management and development of an organisation to which the data relates.

2. Prior Art

The provision of data management and use systems is well known. A use of this type of system is to allow the user of the system to be able to access the data in a managed way in order for answers to specific queries to be obtained. In many cases the organisations using the systems and methods require answers to questions which can be at a strategic level. Typically, these high value decisions in businesses are made by working with, trading, and/or balancing concepts that don't appear in the raw data of the organisation. However, the conventional systems and methods do not provide data which is representative, or an accurate reflection, of these concepts of the organisation. For example, decision making in relation to issues such as 'defence capability', 'contract', 'service', 'budget' are the units of reasoning at senior levels in the military whereas the raw data is at the lower level relating to lines of development that contribute to these issues, not at the level of the issues themselves.

Conventionally, the known systems are capable of accessing a series of databases which include raw data relevant to the organisation. When a specific request for information is raised the system will sift through the raw data in a managed manner and attempt to identify the data which is relevant to the request and then analyse that raw data to try and provide some form of meaningful answer to the request. Thus, the current methods and systems which are provided to support decision making do typically aggregate and analyse business data sourced from business systems but the sources and types of data which are used is not that which is required and/or most relevant to the decision making processes which are typically required to be made at relatively high levels.

A further problem is that as the conventional method and systems rely on data only, considerable time, personnel and expenditure has to be committed to assembling and populating the data resources that are to be used, especially at the implementation stage of the system or method. Typically a data "warehouse" is created initially but this takes time and also is required to be regularly updated such that, in practice, it is found that the conventional systems and methods tend to lag behind real time. A significant amount of processing capability is required to be built into the system which adds to the expense of implementing the same, and it also means that even when the system or method is used to provide an answer, by the time the answer is provided, it may no longer be relevant or pertinent to the real time situation, which may have changed since the question was raised of the system or method.

A yet further problem is that in many conventional systems and methods it is possible that the data which is required for an accurate answer to be generated is not available or is not sufficiently identified for it be referred or be understood to be relevant to the question which has been asked. Yet further, the known systems and methods often have no ordered way of taking into account other aspects of the organisation or the environment external to the organisation, which may have an impact on the answer which is given to the request, and as a result of this, the answer which is given may not be as accurate as desired.

As a result, the conventional methods and systems do not provide the level of support to the decision making process that is required and when one considers that decision making in organisations can be at an investment level, the current approach of attempting to support that decision making process through using the "language of data" by analysis of operational data is not effective or useful. This is because the conventional systems and methods comprises looking at the data that a system, organisation, or community generates and analyses and presenting this to inform decisions rather than providing an answer which is in the language of the organisation posing the question of the models or systems.

SUMMARY OF THE INVENTION

The aim of the present invention is to provide a system and method which allows an organisation, or part thereof, to be represented in a manner which is more accurate and/or comprehensive with respect to the business problem domain than allowed for by conventional systems, and more closely reflects the organisations understanding of itself and to allow the system to be used to provide information relating to specific requests which are made by the user of the system.

In a first aspect of the invention there is provided a method of representing at least part of an organisation by generating at least one model to represent the said part of the organisation, said model allowing the generation of a response to a request for factual and/or predictive information in relation to the said organisation, said method comprising the steps of; including in said model a plurality of items representing features of the organisation, identifying one or more databases which include data relating to the organisation, identifying one or more sources of data external to the said model, and wherein at least some of said items are linked to at least one further item in the model and/or at least one of said databases and/or at least one of the sources of data external to the said model.

Typically the model is designed with reference to the organisation at the commencement of the system. Typically the model is designed to represent the part of the organisation in a form that it is desired that it should be without having to refer to or take in to consideration the types of concept or data that may be available in source systems. In one embodiment the data external of the model is any or any combination of project data, Human Resources data, financial data, security data.

Typically the model includes a plurality of items, each item representative of a feature or concept which is defined as relating to the portion of the organisation which is represented by the model. In one embodiment each of the items are linked to at least one further item within the model.

In one embodiment the degree of relevance and/or causal effect of the link between one item to another item is defined. In one embodiment the degree of relevance is defined with regard to specific requests which may be made of the model such that the degree of relevance of an item can be changed with regard to different requests. In one embodiment the causal effect is defined as the effect of one item to another item or items to which it is linked in providing the final response to a request.

Typically, when required for a particular request, an item obtains information from the one or more databases and/or external sources and/or other items in order to provide a value in response to a request being made of the system.

In one embodiment at least a portion of the data used in the model is calculated using processes defined in the model rather than being obtained directly from a database. This means that even when raw data is not available for a particular item but is identified as being required to allow a particular item value to be generated for one or more responses which are important from an organisation perspective, then this can be identified at the time of developing the model. When identified, a process can be determined as part of the model and the necessary calculations and/or obtaining of data from external sources can be undertaken to allow the required item value to be calculated. This is a clear indication of the value of developing the model from an organisation perspective and utilising external data sources and links between items in the model to provide responses which are of value and are of the required accuracy for use by the organisation.

Typically, the said value is then used directly in the answer of the request or is provided as a source of data required by a further item in a predefined manner and with a predefined degree of relevance or weighting in order to allow that item, and possibly further linked items to be used in generating the response to the request.

In one embodiment the model is defined and generated with relevant items and is performed independently of the data so that the model reflects and fits with the dependencies and impacts on the issue of the organisation to which the same relates.

In one embodiment the model is normative in that it defines a view of the organisation as it should be. Alternatively, the model may be designed to embrace a plurality of possible future states of the organisation.

Typically, at least a subset of the model items are mapped to data, or results of analysis of the data, and transformed, and aggregated across a subset of specified items of the model to provide a representation of current performance expressed in terms of the concepts appropriate to that level of decision making and allows manipulation to inform future options.

Typically new data relating to the organisation is captured and managed by the system at the level of these concepts, and processes are put into place to compensate for bad or absent data, and/or augment the operational data. Recognise that this is not a pure 'tool' function or service, but also about supporting collaborative understanding across a community of decision makers.

Typically the data is extracted from business sources and mapped onto equivalent concepts or items in the model.

Typically the model also includes concepts and content which is defined and mastered in the business model with dependencies between items and across all of the content. Typically the data is aggregated and transformed across all types of concept, using data mastered in the system and hence allowing new types of data to be generated from operational data.

In a further aspect of the invention there is provided a system to represent at least part of an organisation, said system including at least one model which represents at least part of the organisation, said model including a plurality of items representing features of the organisation which are available to be referred to in a predetermined manner wherein said model is provided independently of one or more databases which include data relating to the organisation and accesses data from said one or more databases and/or external sources in a predefined manner to provide a representation of at least part of the organisation at an instant of time.

Typically each item includes a predefined process which is performed when the item is determined as being required to be referred to in generating a response to a request. Typically the process will define what data is required to be obtained and referred to and the manner in which said data is processed to provide a value for use in answering the request.

As a result of the use of this system and method users receive appropriate automated support for their decision process which is more efficient and allows better informed decisions to be made. The user also receives an engagement process with the supplier of this solution that is supportive of the way they need to work, and leads to trust and mutual understanding of the major business challenges and which allows the use of the decisions made to be done with greater confidence.

BRIEF DESCRIPTION OF THE DRAWINGS

Specific embodiments of the invention are now defined with reference to the accompanying drawings; wherein FIG. 1 illustrates in a schematic manner a system generated in accordance with one embodiment of the invention.

DETAILED DESCRIPTION OF THE PREFERRED EMBODIMENTS

Referring to the FIG. 1 there is provided a model which is generated in respect of part of an organisation 2. The model includes a user interface 4 via which a user can interact with the model to make a request for a specific item of information relating to the said organisation, and receive the answer thereto. Upon a request being made, the model 6 is accessed. The model is defined by a series of items 8 which are selected to represent what are believed to be the relevant features which need to be referred to by the model when making decisions regarding the organisation which is represented. Each item defines a process to be followed in order to generate a value which can be used directly to provide an answer to a request or which can be provided to a further item in a predefined manner to allow the process defined in that item to be performed.

Typically, but not necessarily exclusively, each item will refer to one or more sources to obtain data which is required for the process defined thereby to be performed. In one embodiment the sources can comprise one or more databases 10 in which data generated from the organisation is held. Another possible source is one or more resources 12 provided externally of the model or organisation but which are defined as providing information relevant to the feature represented by the item. A yet further source can be one or more of the other items.

In certain cases, when the model is being generated, it may be identified that certain data which would be useful in generating a response is not directly available and therefore as part of the generation of the model means can be included as part of the model to allow the required data values to be generated from one or more sources and/or using one or more defined processes. This then allows the required values to be captured and managed by the system and/or may be entered by a user when making a request.

Thus, in the example illustrated in FIG. 1 a request is made via the user interface and a predefined number of items 8', 8", 8"' are predefined within the model as being required to be referred to in order to provide the answer to that request. Thus, in this case the process of item 8"' is performed to obtain a value and this process requires data to be obtained from the databases 10 and for that data to be processed in a predefined manner to obtain a value 14"' which is then passed to the item 8" which uses that value in conjunction with data from a specific external resource 12 and processes the same to obtain a value 14" which is then passed to item 8'. The process of item 8' may not require any additional data but may simply require that the value is provided in a specific manner with regard to the request which has been raised or the value is satisfied through reference to the value 14" and data contained within the model 6 without the need to refer to external databases 10 or external resources 12.

In another example of the invention there is provided a model which is generated in relation to a Government Department such as the Defence Ministry and in this case the requests which are to be generated relate to the defence capability. In accordance with the invention the first step it to analyse and define what the defence capability actually is and then decide on the features or concepts which are required to be referred to and/or taken into account in order to be able to provide an accurate representation in a model form of the defence capability. By providing the model in this form and to include the features and concepts in a defined manner allows the representation of the defence capability to be accurate and realistic which, in turn allows the information obtained therefrom to be relevant. Examples of features or concepts which are decided as relevant in this case include contracts and services and each of the features is represented as an item in the model. Each of the items includes a process which should be followed in order to allow a value to be obtained for that item feature when the model is run. Links and dependencies between the items can be generated (e.g. supplier works through a contract which is a first item, and a contract provides services which is a second item, and services enable equipment provision over periods of time which is a third item, and equipment performance and readiness, along with several other lines of development, which are represented by other items, contributes to the defence capability.

Data is then created for each of the items for example, to define what an acceptable level of effectiveness would be for a capability in different scenarios, the major categories of equipment and resources required, the suppliers and contracts that are involved in each and the items are mapped to source data at a location where the same is available e.g. existing services, current levels of service and equipment performance. The data from each of the relevant items is then combined to generate new data about implications for current and future business strategy and operations e.g. how to trade expenditure on equipment against expenditure on training to ensure best capability effect across scenario priorities within a budget.

The same principles can be applied for a model in, for example, another area of the military in which it is required to be able to makes queries of a model relating to the capabilities of a fleet of ships in total but also in relation to specific ships or subsets of the fleet to suit specific requests. For example, using raw data in known systems or methods would provide responses which state in a matter of fact way what a situation would be but would not provide a response which would take into effect causal effects and or relevance of certain events occurring in relation to certain items. One such response generated in accordance with the current invention could be in response to a request as to the ability of the fleet to provide defence against certain missile fire and attack in a certain geographical area. In accordance with the invention the model can include links between items in order to take into account the effect of certain types of ships in the fleet being out of service for maintenance and the resultant effect which this would have on the availability of other ships in the fleet at that time if the request was to be made at that time. This linkage of effects to be taken into account would not typically occur in conventional systems and methods.

Of course the invention's uses are not limited only to military uses and another example of use is in relation to an organisation's ability to resist cyber attacks on it's business and systems. In this example, by using a model generated in accordance with the invention, items relevant to the organisation can be linked in such a way as to provide an indication of the effect of a cyber attack on a certain part of the organisation in order to identify whether such an attack would be critical to the operation of the organisation or not. This could result in, for example, a response being given by the model that an attack on one part of the organisation would be regarded as potentially damaging whereas an attack on another part of the organisation would not be as damaging and, as a result of these responses, the organisation can then decide to focus resources on bolstering the part of the organisation which is regarded as being at most risk in terms of the implications of attack thereon.

The present invention utilises a method which allows the model to be generated from the viewpoint of the most beneficial model to the organisation rather than what is most beneficial or easiest for the model developer. To this effect the method preferably includes the step of having the model items reviewed by personnel of the organisation during it's development to provide a critique of the model items and the links between the same.

In a further feature of the invention the model can be used to provide predictive response to a request. In this case the user can input certain data/or data sources and/or amend links between items and/or the relevance and/or causal effect values for those links to reflect a predefined scenario which may occur at a time in the future. The model can then utilise the data and links between the items which are included in the model in order to provide a response which indicates the likely outcome based on the settings made. Different scenarios can then be tested by selecting different data and/or links and/or link values and repeating the request for as many different scenarios as required.

There is provided in accordance with the invention a system and method which can be used to analyse and provide a response indicative of the performance of the organisation represented by the model at an instant of time. The model can also be used to provide an extrapolation of what will happen in the future and yet further can be provided as a testing model to allow the effect of certain interventions to be analysed and assessed. Importantly the model can be designed and developed with the needs of the organisation at the forefront and therefore can be developed with reference to the business processes and needs and therefore can be designed from the top down. This is in contrast to the conventional systems and models which tend to be developed with the raw data bases and data sources being the starting point for the model development and the model which is developed in this manner is Limited by the data which can be sourced therefrom.

The invention claimed is:

1. A method of representing at least part of an organization by generating at least one model to represent the said part of the organization, said model allowing the generation of a response to a request for factual or predictive information in relation to the said organization, said method comprising the steps of;

including in said model a plurality of items representing features or concepts of part of the organization, each of the items linked to at least one further item within the model thereby defining at least one process within the model;

identifying a) one or more databases which include data relating to the organization;

identifying b) one or more sources of data external to the said model, and at least some of said items are linked to at least one of said databases or at least one of the sources of data external to the said model, generating c) at least some data for use in the model by linking items to calculate data in the model directly rather than from a database or a source external to the model;

wherein the degree of relevance or causal effect of the link of one item to another item is defined, the degree of relevance is defined with regard to the context of a request which is made of the model and is adapted with regard to different requests which are received; and the causal effect is defined as the impact of a condition of one item on another item or items to which it is linked to provide the final response, and wherein an item obtains information from said
a) one or more databases, or
b) external sources, and
c) other items to which calculate data in the model directly
d) other items to which calculate data in the model directly to provide a value in response to the request.

2. A method according to claim 1 wherein the model is generated at the commencement of use of the method.

3. A method according to claim 1 wherein the model is defined with relevant items and generated independently of the data.

4. A method according to claim 1 wherein at least a subset of the model items are mapped to data, or results of analysis of data, which is transformed and aggregated across a subset of specified items of the model to provide a representation of current performance of the organization.

5. A method according to claim 1 wherein data which is extracted from organization data sources and mapped onto equivalent items in the model.

6. A method according to claim 1 wherein the model includes concepts and content which is defined and mastered in the business model with dependencies formed between items of the model.

7. A method according to claim 1 wherein the said at least one of the sources of data includes data which has been generated from operational data of the organization.

8. A method according to claim 1 wherein at least a portion of the data used in the model is calculated using processes defined in the model rather than directly from a database.

9. A system to represent at least part of an organization, said system implemented on a computer and comprising:

a computer having a processor and a memory:

at least one model implemented on said computer, wherein said model represents said at least part of the organization, said model allowing the generation of a response to a request for factual or predictive information in relation to the said organization, said model including a plurality of items representing features or concepts of the said part of the organization which are available to be referred to in a predetermined manner, each of the items linked to at least one further item within the model thereby defining at least one process within the model, wherein one or more databases which includes data relating to the organization are identified, one or more sources of data external to the said model are identified and at least some of the said items are linked to at least one of said databases or at least one of the sources of data external to the said model, and at least some data for use in the model is generated by linking items to calculate data in the model directly rather than from a database or a source external to the model; said model is provided independently of one or more databases which include data relating to the organization and accesses data from said one or more databases or external sources in a predefined manner to provide a representation of at least part of the organization at an instant of time wherein the degree of relevance or causal effect of the link of one item to another item is defined, the degree of relevance is defined with regard to the context of a request which is made of the model and is adapted with regard to different requests which are received, and the causal effect is defined as the impact of a condition of one item on another item or items to which it is linked to provide the final response, wherein an item obtains information from said
a) one or more databases, or
b) external sources, and
c) other items to which calculate data in the model directly to provide a value in response to the request.

10. A system according to claim 9 wherein each item includes a predefined process which is performed when the item is determined as being required to be referred to in generating a response to a request made by a user of the model.

11. A system according to claim 10 wherein the predefined process defines what data is required to be obtained and referred to and the manner in which said data is processed to provide a value for use in generating a response to the request.

* * * * *